Sept. 2, 1952          J. F. SPIELMAN          2,609,220
TURNBUCKLE SAFETY-LOCKING SLEEVE AND COMBINATION INVOLVING SAME
Filed March 29, 1949
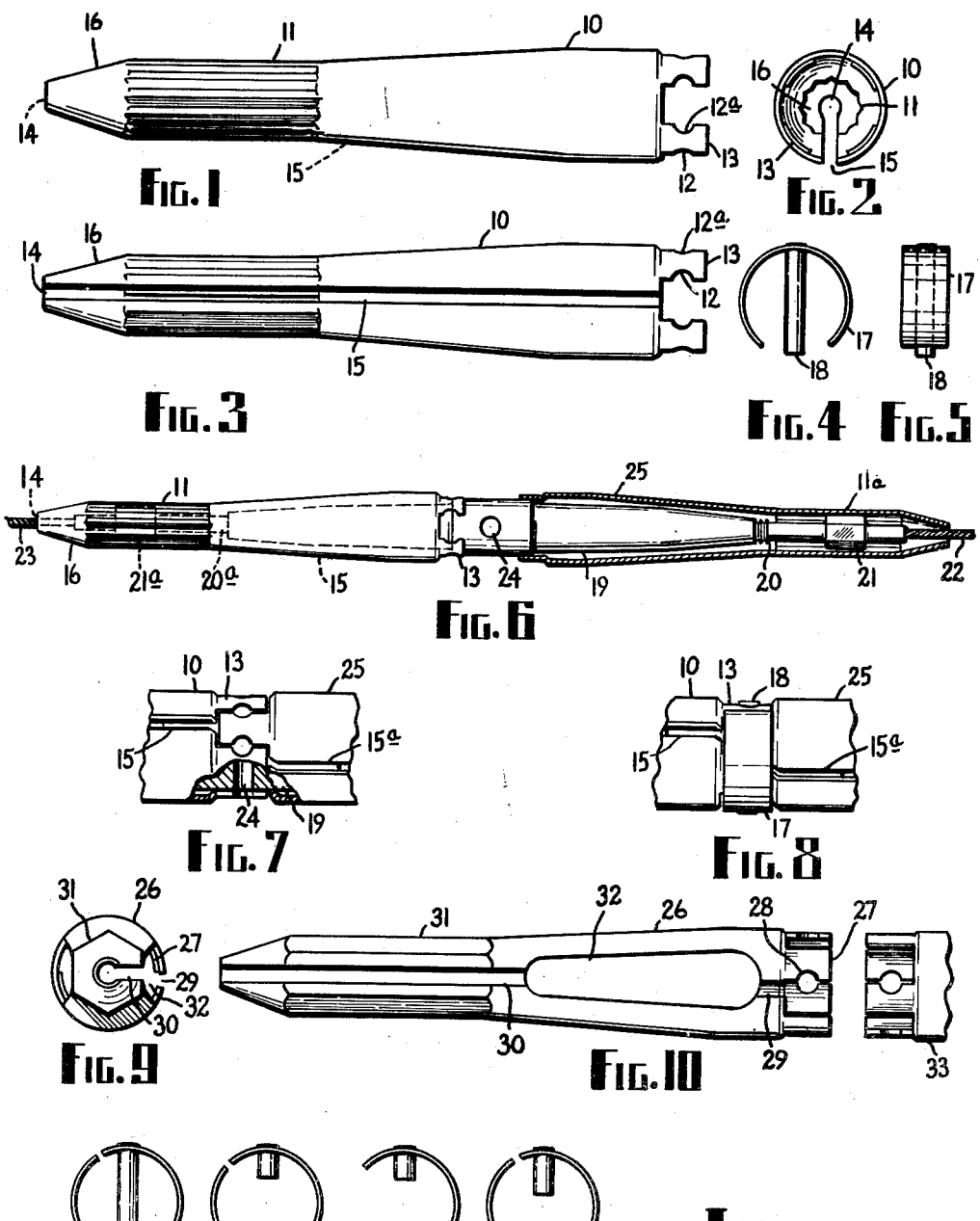
INVENTOR:
James F. Spielman Patented Sept. 2, 1952

2,609,220

UNITED STATES PATENT OFFICE 2,609,220

TURNBUCKLE SAFETY-LOCKING SLEEVE AND COMBINATION INVOLVING SAME

James F. Spielman, Torrington, Conn.

Application March 29, 1949, Serial No. 84,185

4 Claims. (Cl. 287—60)

1

The invention relates to a new, useful and efficient device for safety-locking the many turnbuckles which are in common use on airplanes. The turnbuckle assemblies are usually made in a number of established sizes, and consist of a sleeve-nut threaded oppositely from either end with male screw-members therein. Usually the male screw-members each have an extending rod with a hexagonal flange to which a wrench may be applied and into which aligning cables are swaged. The sleeve-nut has only a diametric hole as means for engaging a tool or a safety-locking device. A turnbuckle assembly is illustrated as part of Fig. 6 in the accompanying drawing.

Until the present time it has been a distressing task for aircraft mechanics to safety-lock turnbuckles after adjusting them. The present method requires a difficult and specific wiring system to prevent loosening of the male screw-members in the sleeve-nut or barrel. This is done by engaging the hole in the barrel with holes in the hexagonal flanges on the male screw-members by a piece of wire. Such a system consumes time and patience, especially when the turnbuckle is inconveniently located in the airplane.

The primary object of the invention, therefore, is to provide a device for securely safety-locking aircraft turnbuckles without necessitating the use of wire.

A second object of the invention is to provide a safety-locking device for aircraft turnbuckles which will be light in weight and easily employed on aircraft now in use without any alteration of the construction of the turnbuckle assembly.

A third object of the invention is to provide a practical coupling and uncoupling means for the safety-locking members.

A fourth object of the invention is to provide a maximum number of lock-points to allow fine adjustment of the turnbuckle assembly.

Other objects and advantages will become apparent in the following description and subsequent claims.

Referring now to the accompanying drawing:

Figs. 1, 2, and 3 are three views of a sleeve member of the locking assembly in orthographic projection; Figs. 4 and 5 are, respectively, a front and side view of a lock-pin and retaining ring assembly; Fig. 6 is a longitudinal view of a turnbuckle assembly, illustrating the adaptation of the invention; Figs. 7 and 8 are operational fragmentary views, further illustrating the operation of the invention; Figs. 9 and 10

2 are two views of other practical sleeve construction departures; and Figs. 11, 12, 13 and 14 are four additional lock-ring assemblies which may be used.

One practical construction of the sleeve members of the invention is seen in Figs. 1, 2 and 3, in which a sleeve 10, conforming with the general shape of a half of a turnbuckle assembly, has a portion twelve-cornered in cross-section, or screw-member lock 11 toward one end. A conical end 16 prevents engagement of the sleeve 10 with airplane bulkheads. The sleeve 10 has a longitudinal breach 15 for placing the sleeve 10 over a cable. A cable hole 14 in the end of the sleeve 10 is arranged to loosely receive a cable.

Projecting longitudinally from the thickened end of the sleeve 10 are four similar and uniformly spaced coupling dogs, 13 being an example. Each coupling dog has two semi-circular depressions, 12 and 12a being examples, one on each of their projecting sides. The "projecting" sides of the coupling dogs are herein construed to mean the sides which are projecting from the sleeves, or those sides which provide the projection.

Figs. 4 and 5 depict a lock-pin 18 diametrically disposed in a lock-pin retaining ring 17. Lock-pin 18 is limited in length to the diameter of the sleeve 10 at the coupling dogs, and divides the circumferential gap in the lock-pin retaining ring 17.

The function of the invention is readily seen in Figs. 6, 7 and 8. The sleeve 10 and a sleeve 25, sleeve 25 being identical with sleeve 10, are oppositely placed over cables 23 and 22 respectively by their longitudinal breaches 15 and 15a (Fig. 3). Sleeves 10 and 25 are then slid over the turnbuckle assembly. Respectively, the screw-member locks 11a and 11 tightly but slidably engage the corners of the hexagonal flanges 21 and 21a on the screw-member rods 20 and 20a of the turnbuckle assembly. Then the coupling dogs, 13 being an example, of both sleeves are meshed (Fig. 7). Upon meshing, the coupling dogs of the sleeves 10 and 25 jointly form eight diametric lock-pin access holes through the sleeves between the projecting sides of the coupling dogs (Fig. 7). The lock-pin 18 is inserted therethrough and through the hole 24 in the turnbuckle barrel 19, thereby engaging the sleeves 10 and 25 with the turnbuckle barrel 19 and coupling the sleeves 10 and 25 from separation one from the other. The lock-pin retaining ring 17, being elastic, urges itself around the coupling dogs of both sleeve 10 and sleeve 25 (Fig. 8). Thus the turnbuckle barrel 19 is engaged with the sleeves 10 and 25; the sleeves 10 and 25 are engaged one with the other; and the sleeves 10 and 25 are engaged with the male turnbuckle screw-members. The peripheral recess at the point of union of the sleeves is provided to receive the lock-pin retaining ring 17 as a precaution against its catching on airplane body members.

To gain access to the turnbuckle assembly to make an adjustment, it is apparent that the lock-pin 18 and the lock-pin retaining ring 17 can be quickly and easily removed, and the sleeves 10 and 25 slid along the cables 23 and 22 respectively. Also evident is the number of lock-pin access holes jointly provided by the meshing of the coupling dogs. A wide range of approach for meshing the coupling dogs is afforded by the number of angular grooves in the screw-member locks 11 and 11a in respect to the male screw-member hexagonal flanges 21a and 21.

Figs. 9 and 10 are two views of other practical sleeve constructions, in which a sleeve 26 has cable-receiving breaches 29 and 30. Sleeve 26 differs from the sleeve 10 in that a hexagonal screw-member lock 31 replaces the twelve-cornered screw-member lock 11 on sleeve 10; a lightening hole 32 is provided for reducing weight and for inspection of the turnbuckle assembly; and the coupling dogs, 27 being an example, are greater in number and have semi-circular depressions, 28 being an example, on only one of their projecting sides. Sleeve 33 is identical with sleeve 26. Thus the lock-pin access holes are formed between the alternate longitudinal sides of the coupling dogs.

Figs. 11, 12, 13 and 14 are four lock-pin and retaining ring departures from that seen in Figs. 4 and 5, their operation being evident as illustrated, and their possible use being a matter of choice, specification or requirement by safety authorities.

Any combination of these sleeve and lock-pin retaining features can be employed in an embodiment of the invention; and various forms of lightening and inspection holes can be arranged in any sleeve member embodiment of the invention.

The foregoing description and accompanying drawing are intended as examples of the invention. The spirit of the invention is set forth in the following claims.

I claim:

1. A device for safety-locking a turnbuckle assembly, said turnbuckle assembly comprising a tubular barrel of circular cross-section, a pair of oppositely threaded male screw members screwing oppositely each in one end of said tubular barrel, said tubular barrel having a diametric hole through the longitudinal center thereof, said pair of oppositely threaded male screw members each having a length of exterior regular hexagonal cross-section: said device combining a pair of similar sleeves fitting oppositely over the named turnbuckle assembly, said pair of sleeves meshing with each other over the midpoint of the named turnbuckle barrel by a plurality of evenly divided longitudinally projecting dogs around the circumference of each of said pair of sleeves, said dogs each having a semi-circular depression on either projecting edge thereof, said pair of sleeves each having interior longitudinal flats of regular hexagonal cross-section at their oppositely projecting ends, said interior longitudinal flats of regular hexagonal cross-section in respective sleeves of said pair of sleeves slidably and non-rotatably engaging the said length of exterior regular hexagonal cross-section on a respective member of the named pair of oppositely threaded male screw members of the named turnbuckle assembly, and a breached circular elastic metal band having a diametric pin disposed thereacross, said diametric pin having a free end, whereby said pin may be inserted through said pair of sleeves by a hole jointly formed by the said semi-circular depressions on the projecting sides of the said longitudinal dogs around the circumference of each of said pair of sleeves and through the diametric hole in the named turnbuckle barrel, and whereby said circular elastic metal band urges itself around the periphery of said pair of sleeves at their mutual meshing point.

2. A device for safety-locking a turnbuckle assembly, said turnbuckle assembly comprising a tubular barrel of circular cross-section, a pair of oppositely threaded male screw members screwing oppositely each in one end of said tubular barrel, said tubular barrel having a diametric hole through the longitudinal center thereof, said pair of oppositely threaded male screw members each having a length of exterior regular hexagonal cross-section: said device combining a pair of similar sleeves fitting oppositely over the named turnbuckle assembly, a longitudinal slot breaching each of said pair of sleeves from end to end, said pair of sleeves meshing with each other over the midpoint of the named turnbuckle barrel by a plurality of evenly divided longitudinally projecting dogs around the periphery of each of said pair of sleeves, said dogs each having a semi-circular depression on either projecting edge thereof, said pair of sleeves each having interior longitudinal flats of regular hexagonal cross-section at their oppositely projecting ends, said interior longitudinal flats of regular hexagonal cross-section in respective sleeves of said pair of sleeves slidably and non-rotatably engaging the said length of exterior regular hexagonal cross-section on a respective member of the named pair of oppositely threaded male screw members of the named turnbuckle assembly, and a breached circular elastic metal band having a diametric pin disposed thereacross, said diametric pin having a free end, whereby said pin may be inserted through said pair of sleeves by a hole jointly formed by the said semi-circular depressions on the projecting sides of the said longitudinal dogs around the periphery of each of said pair of sleeves and through the diametric hole through the named turnbuckle barrel, and whereby said circular elastic metal band urges itself around the periphery of said pair of sleeves at their mutual meshing point.

3. A turnbuckle safety-locking sleeve having a circular interior cross-section including a length of one end thereof and having a length of regular hexagonal interior cross-section at the other end thereof, a longitudinal slot breaching the circumference of said sleeve from end to end, said sleeve having a plurality of similar dogs evenly divided around the circumference of the said circular end thereof and projecting longitudinally therefrom, adjacent dogs of said dogs being spaced apart to a distance substantially equal to and not less than the common maximum width of said dogs, said dogs each having a semi-circular depression at a common point on either projecting edge thereof.

4. A turnbuckle safety-locking sleeve having a circular interior cross-section including a length of one end thereof and having a length of regular hexagonal interior cross-section at the other end thereof, said sleeve having a plurality of evenly divided similar dogs around the circumference of the said circular end thereof and projecting longitudinally therefrom, adjacent dogs of said dogs being spaced apart to a distance substantially equal to and not less than the common maximum width of said dogs, said dogs each having a semi-circular depression at a common point on either projecting edge thereof.

JAMES F. SPIELMAN.

REFERENCES CITED

The following references are of record in the file of this patent:

UNITED STATES PATENTS

| Number | Name | Date |
| --- | --- | --- |
| 191,180 | Rogers | May 22, 1877 |
| 395,399 | Mast | Jan. 1, 1889 |
| 428,058 | Richards | May 13, 1890 |
| 849,952 | Willis | Apr. 9, 1907 |
| 1,254,726 | Portee | Jan. 29, 1918 |
| 1,296,042 | Bralove | Mar. 4, 1919 |
| 1,982,183 | Tarbox | Nov. 27, 1934 |
| 2,176,504 | McLaughlin | Oct. 17, 1939 |
| 2,398,160 | Silver | Apr. 9, 1946 |
| 2,412,566 | De Bell et al. | Dec. 17, 1946 |
| 2,467,481 | Huff | Apr. 19, 1949 |